US011520143B2

(12) United States Patent
Ogisu et al.

(10) Patent No.: US 11,520,143 B2
(45) Date of Patent: Dec. 6, 2022

(54) DISPLAY DEVICE FOR VEHICLE

(71) Applicant: Yazaki Corporation, Tokyo (JP)

(72) Inventors: Takuma Ogisu, Shizuoka (JP); Kunimitsu Aoki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 267 days.

(21) Appl. No.: 17/010,774

(22) Filed: Sep. 2, 2020

(65) Prior Publication Data

US 2021/0072539 A1  Mar. 11, 2021

(30) Foreign Application Priority Data

Sep. 5, 2019 (JP) .............................. JP2019-161914

(51) Int. Cl.
*G02B 27/01* (2006.01)
*B60K 35/00* (2006.01)

(52) U.S. Cl.
CPC .......... *G02B 27/0103* (2013.01); *B60K 35/00* (2013.01); *B60K 2370/1529* (2019.05); *B60K 2370/785* (2019.05)

(58) Field of Classification Search
CPC ............ G02B 27/0103; G02B 27/0018; G02B 27/0179; G02B 2027/0105; G02B 2027/0183; B60K 35/00; B60K 2370/1529; B60K 2370/785
See application file for complete search history.

(56) References Cited

U.S. PATENT DOCUMENTS

| 5,210,624 | A | * | 5/1993 | Matsumoto | ........ | G02B 27/0103 |
| | | | | | | 359/24 |
| 5,781,345 | A | | 7/1998 | Ferrante et al. | | |
| 2005/0012682 | A1 | | 1/2005 | Jenson et al. | | |
| 2013/0038935 | A1 | | 2/2013 | Moussa et al. | | |
| 2020/0126305 | A1 | * | 4/2020 | Cappuccilli | ........ | G02B 27/0103 |

FOREIGN PATENT DOCUMENTS

| CN | 109257939 A | * | 1/2019 |
| CN | 109257939 A | | 1/2019 |
| JP | H06-130317 A | | 5/1994 |
| JP | H06130317 A | * | 5/1994 |
| JP | 11-91401 A | | 4/1999 |

* cited by examiner

*Primary Examiner* — Brent D Castiaux
(74) *Attorney, Agent, or Firm* — Kenealy Vaidya LLP

(57) ABSTRACT

A display device for a vehicle includes: a first display device including a reflection type hologram that is disposed on a windshield of a vehicle, and a first projection part that projects first display light toward the hologram, and displaying a first display image by diffraction light diffracted by the hologram; and a second display device including a second projection part that projects second display light toward the windshield, and displaying a second display image by reflection light reflected by the windshield. In the windshield, a first region where the first display light is incident and a second region where the second display light is incident overlap with each other, the second projection part includes a filter part that cuts light in a predetermined wavelength region from the second display light, and the predetermined wavelength region is a wavelength region of the light diffracted by the hologram.

15 Claims, 8 Drawing Sheets

DISPLAY DEVICE FOR VEHICLE

CROSS-REFERENCE TO RELATED APPLICATION(S)

The present application claims priority to and incorporates by reference the entire contents of Japanese Patent Application No. 2019-161914 filed in Japan on Sep. 5, 2019.

BACKGROUND OF THE INVENTION

1. Field of the Invention

The present invention relates to a display device for a vehicle.

2. Description of the Related Art

Some of the conventional display devices utilize a hologram. Japanese Patent Application Laid-open No. H11-91401 discloses a holographic display device for a vehicle. This holographic display device includes an information display source that generates information to be displayed as light, and a combiner that includes a hologram disposed in a dark-color concealing part at a peripheral part of a windshield of the vehicle and diffracting light toward an observer to display a virtual image.

The present applicant has examined to display a plurality of display images using a plurality of image display devices in a vehicle. When the display images are displayed, it is desirable that the visibility of the display images deteriorates less. For example, the deterioration in visibility of the display images can be suppressed if the occurrence of ghost due to light diffracted in the hologram can be suppressed.

SUMMARY OF THE INVENTION

An object of the present invention is to provide a display device for a vehicle that can suppress the deterioration in visibility of display images.

In order to solve the above mentioned problem and achieve the object, a display device for a vehicle according to one aspect of the present invention includes a first display device including a reflection type hologram that is disposed on a windshield of the vehicle, and a first projection part that projects first display light toward the hologram, and displaying a first display image by diffraction light diffracted by the hologram; and a second display device including a second projection part that projects second display light toward the windshield, and displaying a second display image by reflection light reflected by the windshield, wherein in the windshield, a first region where the first display light is incident and a second region where the second display light is incident overlap with each other, the second projection part includes a filter part that cuts light in a predetermined wavelength region from the second display light, and the predetermined wavelength region is a wavelength region of the light diffracted by the hologram.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A display device for a vehicle according to one embodiment of the present invention is described in detail with reference to the drawings. Note that the present invention is not limited by this embodiment. In addition, the components in the embodiment below include the component that is easily conceivable by the person skilled in the art or that is substantially the same.

Embodiment

Figure 1:
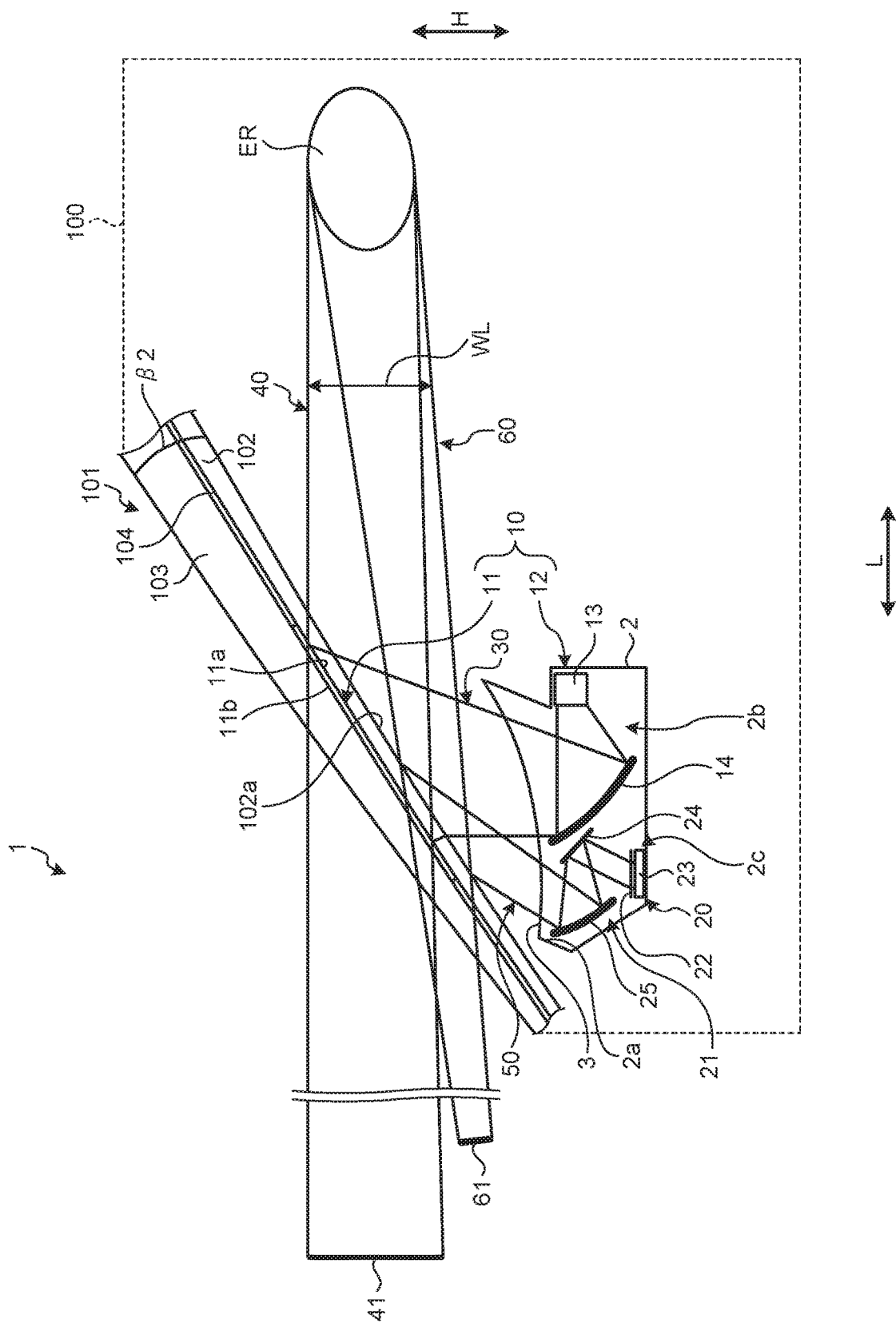
FIG. 1 is a schematic structure diagram of a display device for a vehicle according to one embodiment.
Figure 2:
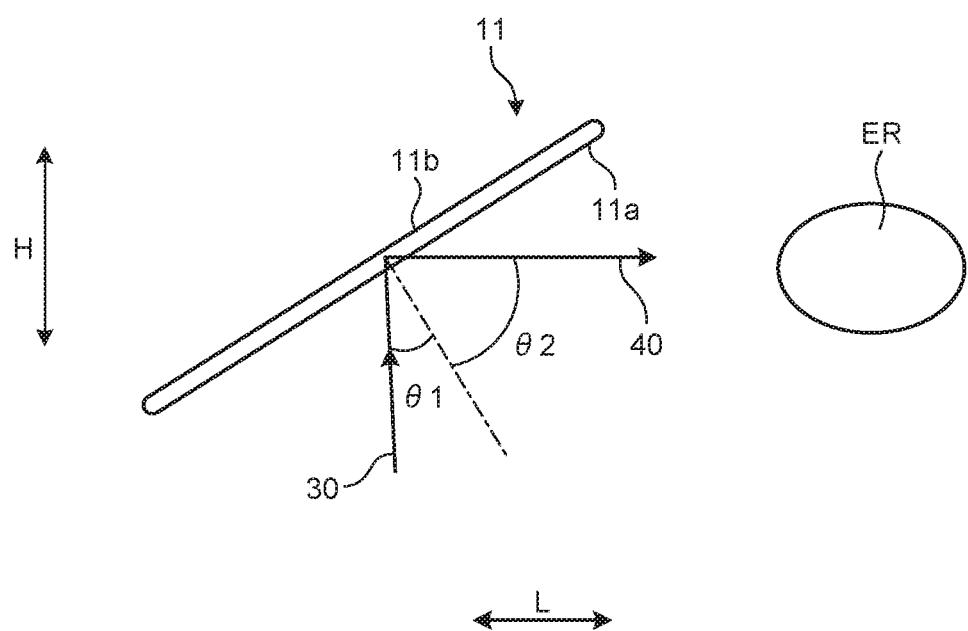
FIG. 2 is a diagram for describing diffraction of light by a hologram according to the embodiment.
Figure 3:
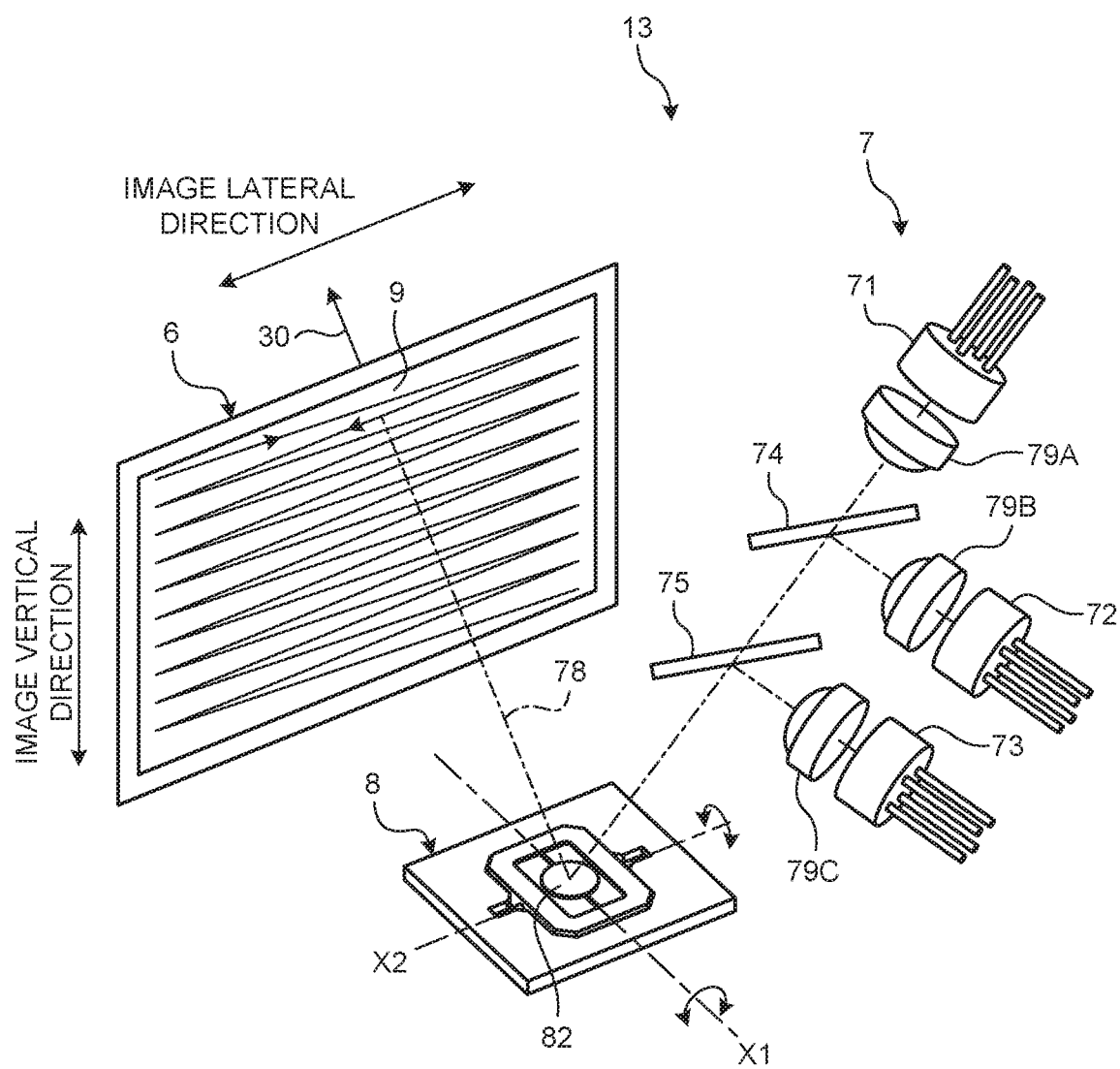
FIG. 3 is a structure diagram of a laser unit according to the embodiment.
Figure 4:
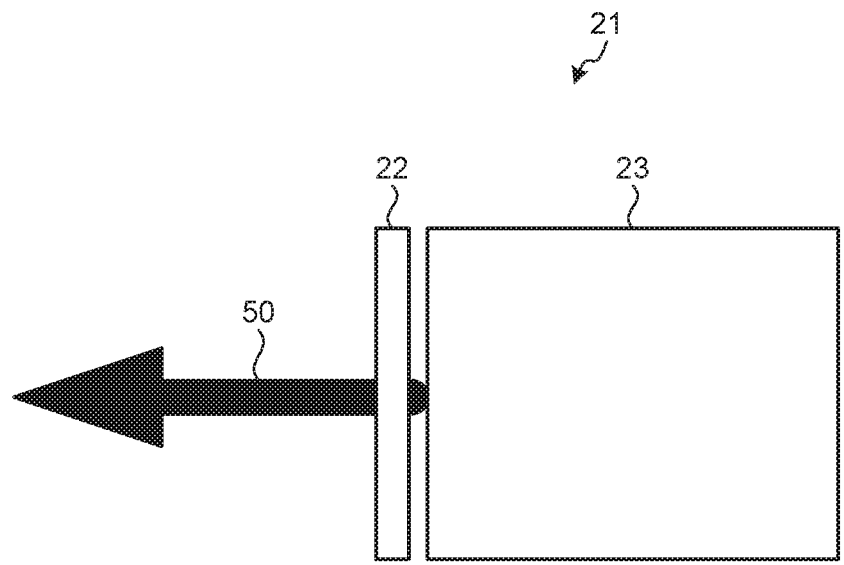
FIG. 4 is a diagram illustrating an arrangement example of a filter part according to the embodiment.
Figure 5:
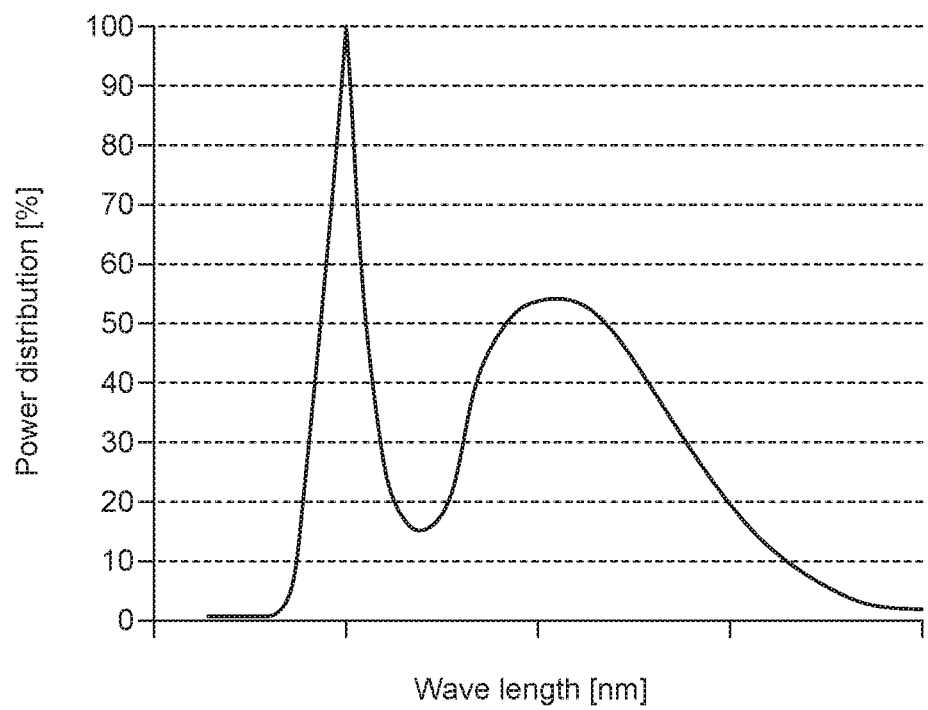
FIG. 5 is a diagram illustrating an example of a spectrum of output light output from a liquid crystal display unit.
Figure 6:
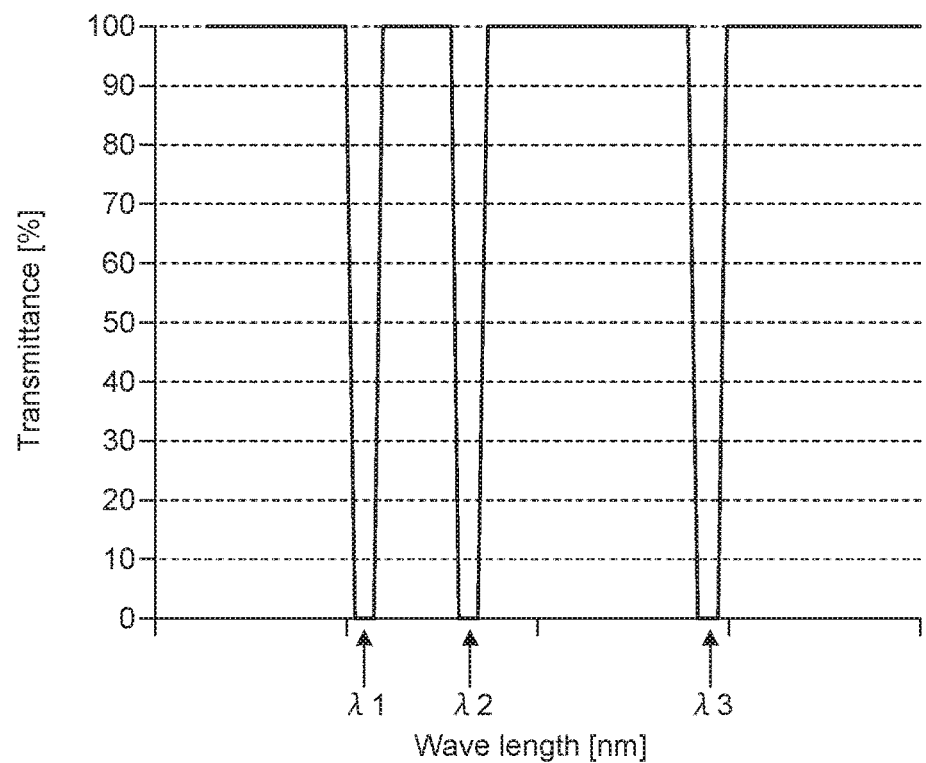
FIG. 6 is a diagram illustrating an optical characteristic of the filter part according to the embodiment.
Figure 7:
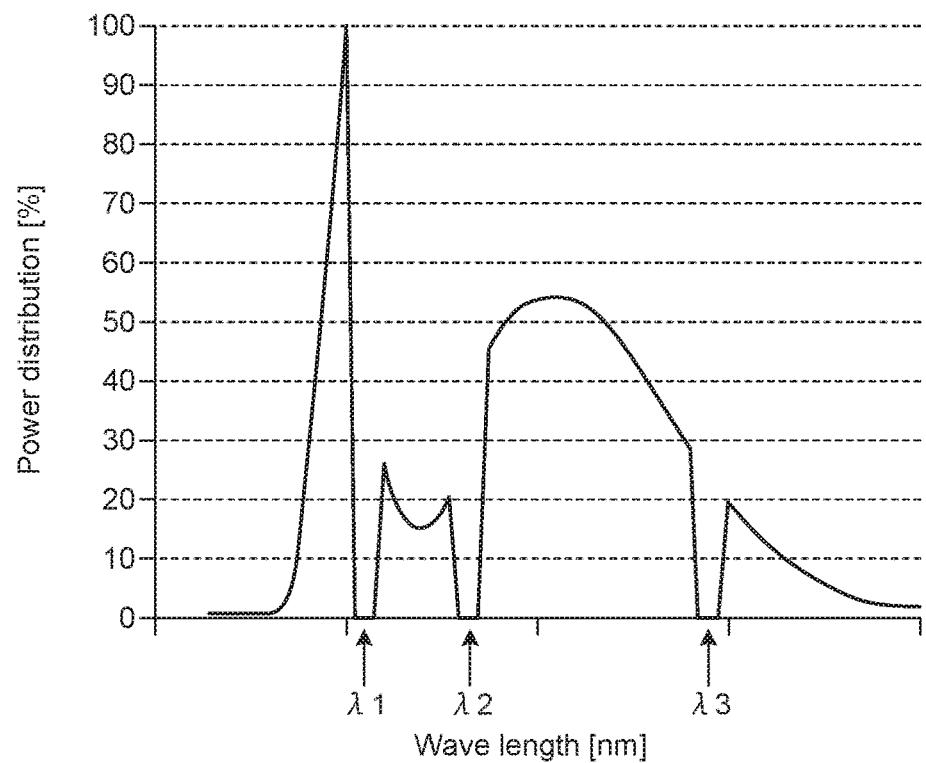
FIG. 7 is a diagram illustrating a spectrum of second display light output from the filter part according to the embodiment.
Figure 8:
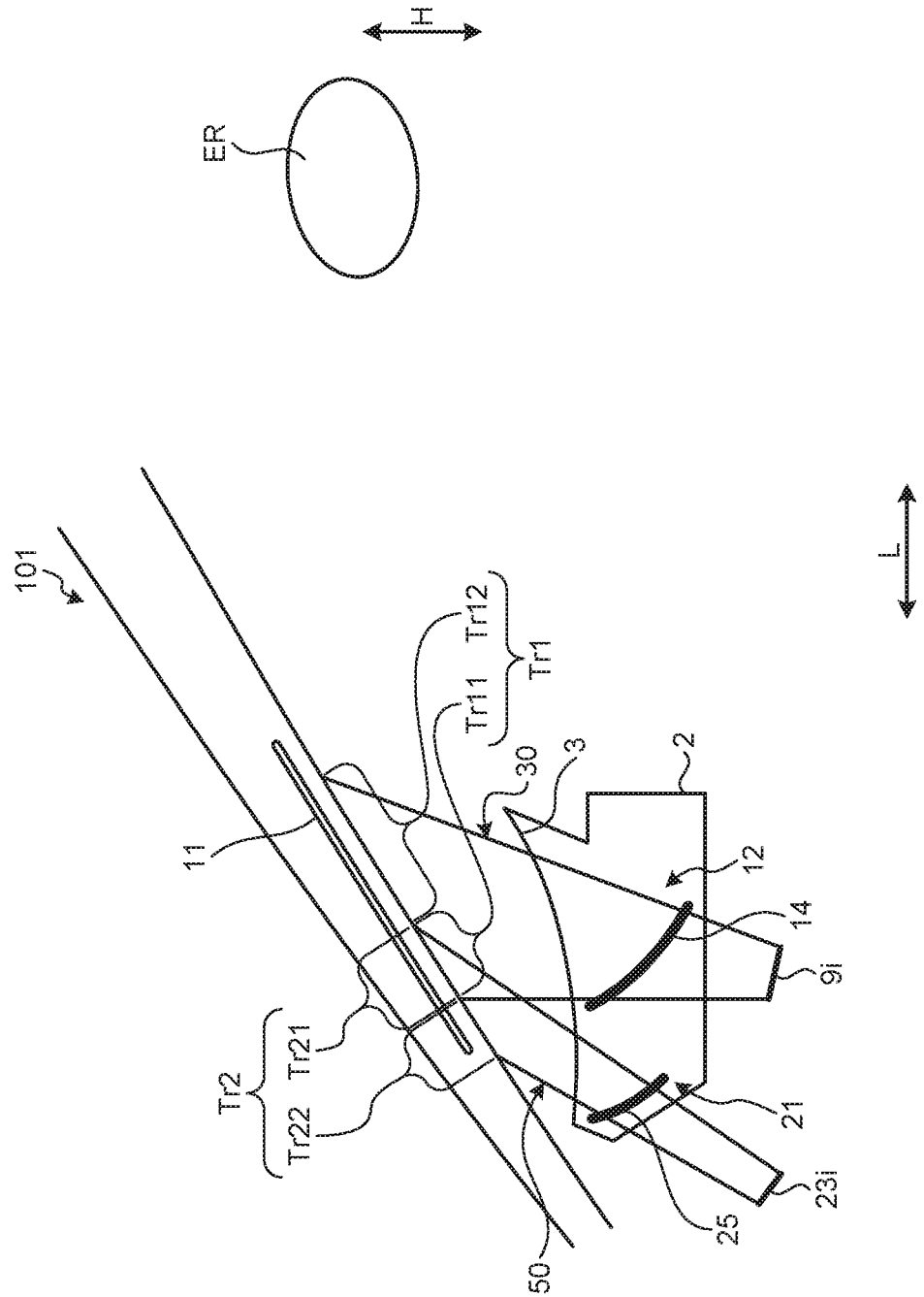
FIG. 8 is a diagram for describing a first region and a second region according to the embodiment.
Figure 9:
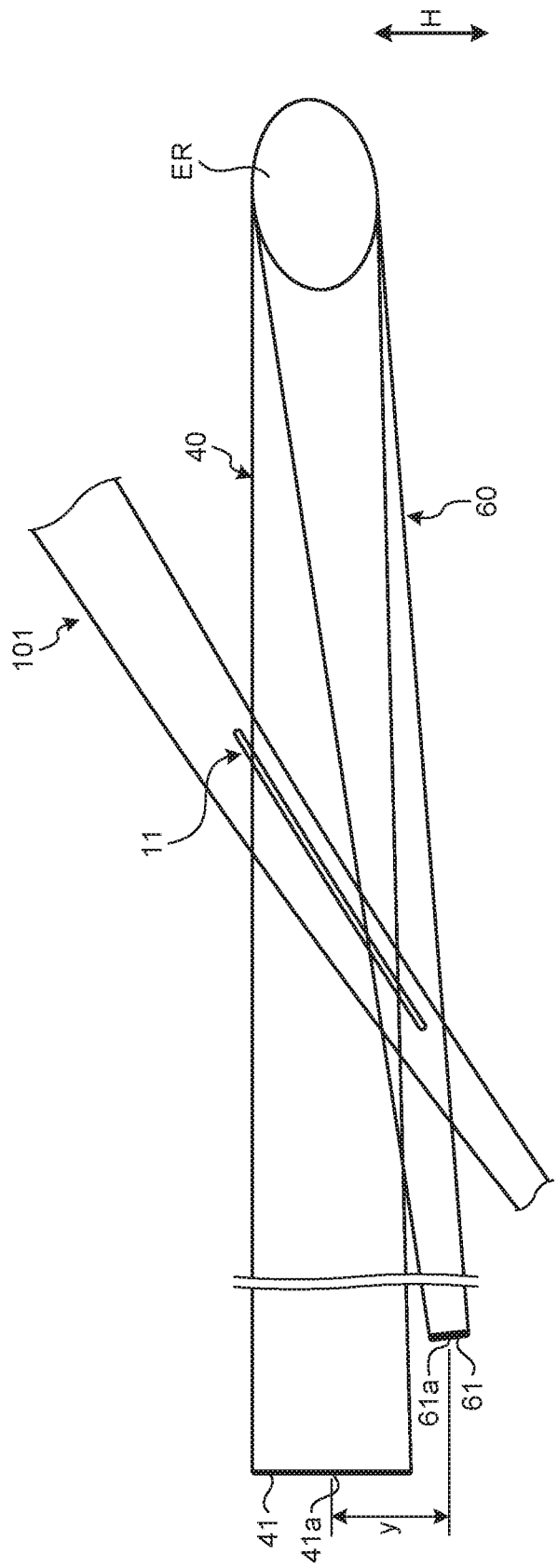
FIG. 9 is a diagram illustrating a positional relation between a first display image and a second display image according to the embodiment.
Figure 10:
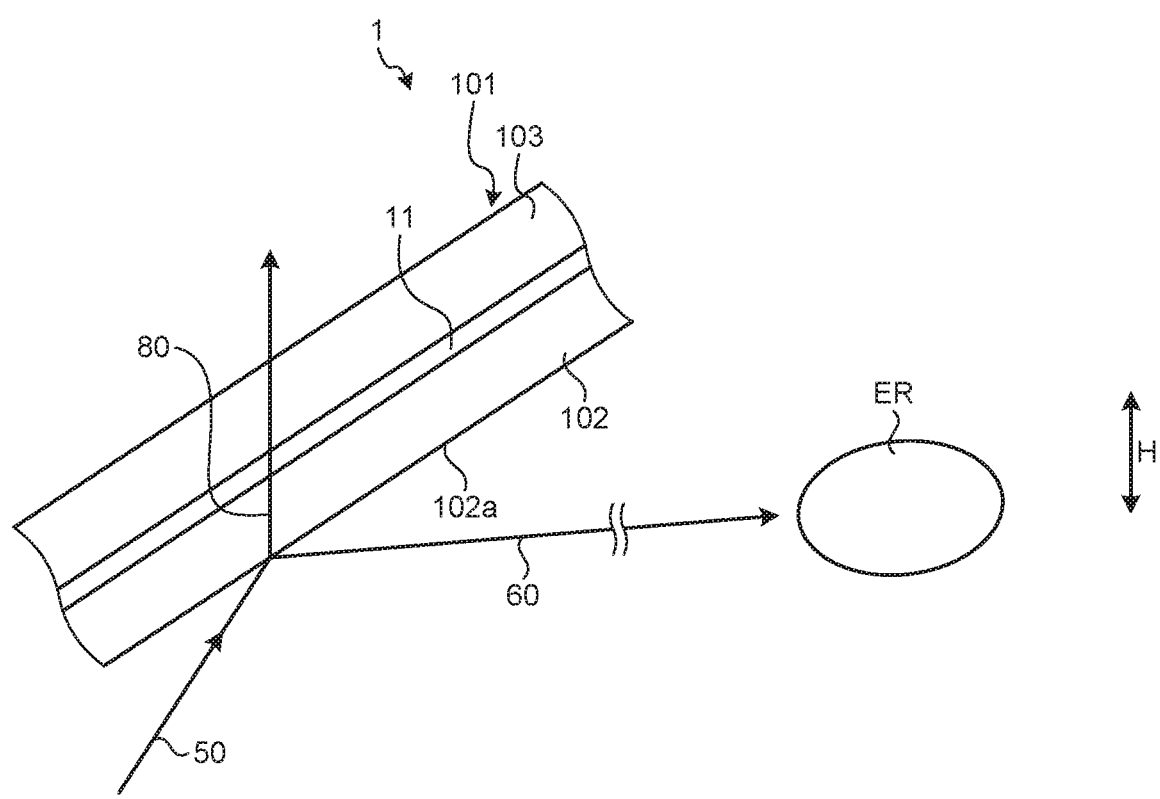
FIG. 10 is a diagram illustrating transmission light that transmits the hologram.

With reference to FIG. 1 to FIG. 10, one embodiment is described. The present embodiment is related to a display device for a vehicle. FIG. 1 is a schematic structure diagram of a display device for a vehicle according to the embodiment. FIG. 2 is a diagram for describing diffraction of light by a hologram according to the embodiment. FIG. 3 is a structure diagram of a laser unit according to the embodiment. FIG. 4 is a diagram illustrating an arrangement example of a filter part according to the embodiment. FIG. 5 is a diagram illustrating an example of a spectrum of output light output from a liquid crystal display unit. FIG. 6 is a diagram illustrating an optical characteristic of the filter part according to the embodiment. FIG. 7 is a diagram illustrating a spectrum of second display light output from the filter part according to the embodiment. FIG. 8 is a diagram for describing a first region and a second region according to the embodiment. FIG. 9 is a diagram illustrating a positional relation between a first display image and a second display image according to the embodiment. FIG. 10 is a diagram illustrating transmission light that transmits the hologram.

As illustrated in FIG. 1, a display device 1 for a vehicle according to the present embodiment is a head-up display device that is mounted on a vehicle 100 such as an automobile. The display device 1 for a vehicle includes a first display device 10 and a second display device 20. The first display device 10 includes a hologram 11 and a first projection part 12. The first display device 10 displays a first display image 41 by diffraction light 40 that is diffracted by the hologram 11.

The second display device 20 includes a second projection part 21. The second display device 20 displays a second display image 61 by reflection light 60 that is reflected by a windshield 101. The second display device 20 according to the present embodiment includes a filter part 22. The filter part 22 cuts the light in a wavelength region that is diffracted by the hologram 11. The display device 1 for a vehicle according to the present embodiment can suppress the occurrence of ghost and improve the visibility of the first display image 41 and the second display image 61 as described below.

The hologram 11 is disposed inside the windshield 101 of the vehicle 100. The windshield 101 is a glass laminate, and includes an inner glass 102, an outer glass 103, and an intermediate film 104. The intermediate film 104 and the hologram 11 are sealed between the inner glass 102 and the outer glass 103. The intermediate film 104 is formed of synthetic resin such as polymer. For example, the hologram 11 may be unified with the intermediate film 104 or inserted into the intermediate film 104. The hologram 11 may be attached to a surface 102a of the inner glass 102 on a compartment side.

The hologram 11 is a transparent film that is processed so as to have a desired diffraction characteristic. The hologram 11 according to the present embodiment is a reflection type hologram. The hologram 11 includes a first surface 11a and a second surface 11b. The first surface 11a is a surface facing the compartment side. The hologram 11 diffracts the light that is incident into the first surface 11a, and emits the diffraction light 40 from the first surface 11a.

As illustrated in FIG. 2, the hologram 11 having received the light in the first surface 11a at a first angle θ1 outputs the diffraction light 40 from the first surface 11a. The hologram 11 is made so that the emission angle of the diffraction light 40 is a second angle θ2. The second angle θ2 is determined so that the diffraction light 40 travels to an eye range ER. The eye range ER is a region assumed as an eye position of a driver of the vehicle 100. In the hologram 11 according to the present embodiment, the first angle θ1 and the second angle θ2 are different depending on the position along a height direction H. The hologram 11 is formed so as to condense the diffraction light 40 toward the eye range ER, and this is described below.

When the incidence angle of the light to the first surface 11a is different from the first angle θ1, the hologram 11 transmits the light. That is to say, the hologram 11 reflects the light that is incident at the first angle θ1 toward the eye range ER selectively. In addition, the hologram 11 transmits the light that is incident into the second surface 11b toward the eye range ER.

As illustrated in FIG. 1, the first projection part 12 and the second projection part 21 are housed in a common casing 2. The casing 2 is disposed inside a dashboard of the vehicle 100, for example. The casing 2 includes an opening part 2a, and is fixed to the vehicle 100 with the opening part 2a facing upward. The dashboard includes an opening in accordance with the opening part 2a of the casing 2. The opening part 2a is closed by a cover 3. The cover 3 is a transparent member, and transmits first display light 30 and second display light 50. The casing 2 includes a first housing part 2b and a second housing part 2c. The second housing part 2c is a part that is positioned ahead of the first housing part 2b in a vehicle front-rear direction L.

The first projection part 12 includes a laser display unit 13 and a mirror 14. The laser display unit 13 and the mirror 14 are housed in the first housing part 2b. The laser display unit 13 is a device that generates the first display light 30 by the laser light. FIG. 3 illustrates one example of the laser display unit 13. The laser display unit 13 includes a laser unit 7, a MEMS mirror 8, and a screen 9.

The laser unit 7 is a light source that emits laser light. The laser unit 7 according to the present embodiment generates red, green, and blue laser light and overlaps and outputs these three colors of laser light. The laser unit 7 includes a red laser diode 71, a green laser diode 72, a blue laser diode 73, and dichroic mirrors 74 and 75. The red laser diode 71 generates the red laser light. The green laser diode 72 generates the green laser light. The blue laser diode 73 generates the blue laser light. The red laser light, the green laser light, and the blue laser light are overlapped on each other by the dichroic mirrors 74 and 75 and delivered to the MEMS mirror 8.

The MEMS mirror 8 projects an image to the screen 9 through a mirror 82 that is rotated and vibrated about two rotation shafts X1 and X2, which are orthogonal to each other. As the mirror 82 is rotated and vibrated about the first rotation shaft X1, the screen 9 is scanned with the reflection light 78 that is reflected by the mirror 82 in an image lateral direction. In addition, as the mirror 82 is rotated and vibrated about the second rotation shaft X2, the screen 9 is scanned with the reflection light 78 in an image vertical direction. The laser display unit 13 projects the image to the screen 9 while the screen 9 is scanned with the reflection light 78 in the image lateral and vertical directions.

The screen 9 is a microlens array, and includes a number of integrated microlenses. That is to say, the screen 9 is a transmissive screen that transmits light. Each microlens diffuses laser light. Thus, even if the eye point of the user moves within the eye range ER as the user's posture changes, for example, the user can recognize the laser light reflected on the windshield 101.

The first display light 30 output from the laser display unit 13 is reflected toward the hologram 11 by the mirror 14 as illustrated in FIG. 1. The mirror 14 according to the embodiment is a magnifying mirror. The shape of a reflection surface of the mirror 14 is a free-form surface, and the mirror 14 magnifies the first display light 30 and reflects the magnified light to the hologram 11. As illustrated in FIG. 1, the first display light 30 reflected by the mirror 14 passes the opening part 2a, and is projected to a region in the windshield 101 that corresponds to the hologram 11.

The hologram 11 according to the embodiment is configured to selectively diffract the laser light output from the laser unit 7. That is to say, the wavelength region of the light that is delivered to the hologram 11 when an interference fringe is generated in the hologram 11 is the same as the wavelength region of the laser light that is output from the laser unit 7. Therefore, the hologram 11 outputs, to the eye range ER, the laser light output from the laser unit 7 as the diffraction light 40. On the other hand, when the light with the wavelength that is not included in the wavelength region of the laser light output from the laser unit 7 has entered the first surface 11a, the hologram 11 transmits the light.

The hologram 11 with the aforementioned structure outputs the first display light 30, which is incident from the mirror 14, as the diffraction light 40 that travels toward the eye range ER. When the user sees the hologram 11 from the eye range ER, the user recognizes the first display image 41 by the diffraction light 40. The first display image 41 is a virtual image that the user recognizes by the diffraction light 40. The first display image 41 forms an image ahead of the hologram 11 in the vehicle front-rear direction L from the viewpoint of the user.

The hologram 11 according to the present embodiment has a diffraction characteristic that condenses the diffraction light 40 to the eye range ER. For example, a width WL of the diffraction light 40 that travels to the eye range ER becomes narrower from the hologram 11 to the eye range ER. The width WL is the width of the diffraction light 40 in the height direction H. Note that the hologram 11 may be formed so that the width of the diffraction light 40 in a vehicle width direction becomes narrower to the eye range ER. The hologram 11 according to the present embodiment can magnify the first display image 41 so that the user can recognize this image.

The first display device 10 can display the first display image 41 in a manner that the first display image 41 is overlapped on the foreground of the vehicle 100. The first display device 10 can display an information image on an overlapping object in the foreground. Examples of the overlapping object include a pedestrian, a road surface ahead, a preceding vehicle, and an obstacle. In this case, the information image is displayed so as to overlap with the overlapping object or be positioned near the overlapping object when viewed from the eye range ER.

The second projection part 21 includes the filter part 22, a liquid crystal display unit 23, a first mirror 24, and a second mirror 25. The liquid crystal display unit 23 includes, for example, a TFT-LCD (Thin Film Transistor-Liquid Crystal Display), and a backlight unit. The liquid crystal display unit 23 outputs the second display light 50.

As illustrated in FIG. 4, the second display light 50 output from the liquid crystal display unit 23 is output through the filter part 22. The filter part 22 is a wavelength-selection filter that cuts light in a predetermined wavelength region and transmits the second display light 50. FIG. 5 illustrates one example of the spectrum of the output light output from the liquid crystal display unit 23. FIG. 6 is a diagram illustrating an optical characteristic of the filter part 22, and FIG. 7 is a diagram illustrating the spectrum of the second display light 50 output from the filter part 22. In FIG. 5 and FIG. 7, the horizontal axis represents wavelength [nm] and the vertical axis represents power distribution [%]. In FIG. 6, the horizontal axis represents wavelength [nm] and the vertical axis represents transmittance [%].

The liquid crystal display unit 23 according to the present embodiment can output light in a visible region including blue light, green light, and red light. As illustrated in FIG. 6, the filter part 22 cuts light in a first wavelength region $\lambda 1$, a second wavelength region $\lambda 2$, and a third wavelength region $\lambda 3$. The filter part 22 transmits light other than the light in these three wavelength regions $\lambda 1$, $\lambda 2$, and $\lambda 3$ described above.

The first wavelength region $\lambda 1$ is a wavelength region of the blue light. The first wavelength region $\lambda 1$ in the present embodiment is the wavelength region of the laser light output from the blue laser diode 73. The second wavelength region $\lambda 2$ is a wavelength region of the green light. The second wavelength region $\lambda 2$ in the present embodiment is the wavelength region of the laser light output from the green laser diode 72. The third wavelength region $\lambda 3$ is a wavelength region of the red light. The third wavelength region $\lambda 3$ in the present embodiment is the wavelength region of the laser light output from the red laser diode 71.

In the description below, the first wavelength region $\lambda 1$, the second wavelength region $\lambda 2$, and the third wavelength region $\lambda 3$ are collectively referred to as "a predetermined wavelength region $\lambda 0$". The predetermined wavelength region $\lambda 0$ is a wavelength region of the light diffracted by the hologram 11. Therefore, the filter part 22 is configured to cut the light, from the light output from the liquid crystal display unit 23, that is in the wavelength region (predetermined wavelength region $\lambda 0$) diffracted by the hologram 11. In other words, the filter part 22 selectively passes the light in the wavelength region that transmits the hologram 11. As illustrated in FIG. 7, the power distribution of the second display light 50 output from the filter part 22 is substantially zero in the first wavelength region $\lambda 1$, the second wavelength region $\lambda 2$, and the third wavelength region $\lambda 3$.

As illustrated in FIG. 1, the second display light 50 having transmitted through the filter part 22 is reflected by the first mirror 24 and the second mirror 25. The first mirror 24 is a planar mirror, for example. The second mirror 25 is a magnifying mirror, for example. The second mirror 25 reflects the second display light 50 toward the windshield 101. The second display light 50 is reflected toward the eye range ER by the surface 102a of the windshield 101 on the compartment side. When the user sees the reflection light 60 reflected by the windshield 101 from the eye range ER, the user recognizes the second display image 61 by the reflection light 60. The second display image 61 is formed ahead of the windshield 101 in the vehicle front-rear direction L from the viewpoint of the user. Note that the windshield 101 has a wedge angle $\beta 2$. The wedge angle $\beta 2$ is determined so that the occurrence of a double image due to the second display light 50 is suppressed.

As illustrated in FIG. 8, the first projection part 12 projects the first display light 30 to a first region Tr1 of the windshield 101. The second projection part 21 projects the second display light 50 to a second region Tr2 of the windshield 101. The first region Tr1 and the second region Tr2 are the regions on the surface 102a on the compartment side. In the display device 1 for a vehicle according to the present embodiment, the first region Tr1 is larger than the second region Tr2. Here, the area of the first region Tr1 and the area of the second region Tr2 are the areas in the height direction H along the windshield 101.

The first region Tr1 includes a lower first region Tr11 and an upper first region Tr12. The lower first region Tr11 is a part of the first region Tr1 that overlaps with the second region Tr2. The upper first region Tr12 is a part of the first region Tr1 that does not overlap with the second region Tr2. In other words, the lower first region Tr11 is a part of the first region Tr1 that excludes the upper first region Tr12.

The second region Tr2 includes an upper second region Tr21 that overlaps with the first region Tr1, and a lower second region Tr22 that does not overlap with the first region Tr1. The lower second region Tr22 is a part of the second region Tr2 that excludes the upper second region Tr21.

In the present embodiment, the upper first region Tr12 is larger than the lower first region Tr11. In addition, the upper second region Tr21 is larger than the lower second region Tr22. In other words, most of the second region Tr2 overlaps with the first region Tr1.

At least a part of the second region Tr2 faces the hologram 11. In the arrangement according to the present embodiment, the entire upper second region Tr21 and a part of the lower second region Tr22 face the hologram 11. Note that FIG. 8 illustrates a virtual display plane 23i and a virtual screen 9i. The virtual display plane 23i and the virtual screen 9i are virtual image display planes. The virtual display plane 23i is, for example, a position of the image that is recognized when the second mirror 25 is directly viewed from above. The virtual screen 9i is, for example, a position of the image that is recognized when the mirror 14 is directly viewed from above.

In the display device 1 for a vehicle according to the present embodiment, a part of the first region Tr1 and a part of the second region Tr2 overlap with each other; therefore, the first display image 41 and the second display image 61 can be brought close to each other. For example, as illustrated in FIG. 9, a distance y from a center 41a of the first display image 41 and a center 61a of the second display image 61 can be made shorter. The display device 1 for a vehicle may display the image so that the first display image 41 and the second display image 61 are substantially continuous along the height direction H when the display device 1 is viewed from the eye range ER.

The display device 1 for a vehicle according to the present embodiment is configured to suppress the occurrence of the ghost due to the second display light 50. As described above, the filter part 22 cuts the light in the predetermined wavelength region λ0 from the second display light 50. Therefore, in the case where the second display light 50 is incident into the hologram 11, the second display light 50 transmits through the hologram 11. As illustrated in FIG. 10, the second display light 50 having entered the surface 102a on the compartment side is mostly reflected as the reflection light 60 toward the eye range ER.

On the other hand, a part of the second display light 50 is incident into the hologram 11 after passing the inner glass 102. FIG. 10 illustrates transmission light 80 corresponding to a part of the second display light 50 that transmits the inner glass 102. Here, the transmission light 80 does not include the light in the predetermined wavelength region λ0 substantially. Therefore, the transmission light 80 transmits through the hologram 11 and goes out of the vehicle. That is to say, the second projection part 21 in the present embodiment projects the second display light 50 that is not diffracted by the hologram 11. Thus, the display device 1 for a vehicle according to the present embodiment can suppress the occurrence of the ghost and improve the visibility of at least the first display image 41.

Note that the ghost in the present description is the virtual image to be generated when it is assumed that the second display light 50 is diffracted by the hologram 11. In the case where the second display light 50 includes the light in the predetermined wavelength region λ0, the light in the predetermined wavelength region λ0 is diffracted by the hologram 11, and the diffraction light that travels toward the eye range ER is generated. The generation of the diffraction light results in the ghost that overlaps with the first display image 41. The display device 1 for a vehicle according to the present embodiment can suppress the deterioration in visibility of the first display image 41 due to the occurrence of the ghost.

In the display device 1 for a vehicle according to the present embodiment, the first display device 10 and the second display device 20 perform cooperating display and interlocking display. For example, the display device 1 for a vehicle causes the first display device 10 to display partially or entirely the display content that has been displayed by the second display device 20. In this case, the display device 1 for a vehicle may display the display content in both the first display image 41 and the second display image 61, or may move the display content from the second display image 61 to the first display image 41.

The display content to be a subject of the cooperating display or the interlocking display corresponds to, for example, display of route guidance (arrow) for navigation, display of lane change guidance, or emphasized display of an obstacle. The display content is emphasized in the first display image 41. For example, the display device 1 for a vehicle displays the display content in the first display image 41 to be larger than the display content in the second display image 61. The display device 1 for a vehicle may display the display content in the first display image 41 with an alerting color or a warning color. In the display device 1 for a vehicle according to the present embodiment, the first display image 41 and the second display image 61 are recognized side by side along the height direction H. Therefore, the cooperating display and the interlocking display are easily understood by the user.

As described above, the display device 1 for a vehicle according to the present embodiment includes the first display device 10 and the second display device 20. The first display device 10 includes the reflection type hologram 11 that is disposed on the windshield 101 of the vehicle 100, and the first projection part 12 that projects the first display light 30 toward the hologram 11. The first display device 10 displays the first display image 41 by the diffraction light 40 diffracted by the hologram 11. The second display device 20 includes the second projection part 21 that projects the second display light 50 toward the windshield 101, and displays the second display image 61 by the reflection light 60 reflected by the windshield 101.

In the windshield 101, the first region Tr1 where the first display light 30 is incident and the second region Tr2 where the second display light 50 is incident overlap with each other. The second projection part 21 includes the filter part 22 that cuts the light in the predetermined wavelength region λ0 from the second display light 50. The predetermined wavelength region λ0 is the wavelength regions λ1, λ2, and λ3 of the light diffracted by the hologram 11.

The display device 1 for a vehicle according to the present embodiment can suppress the occurrence of the ghost due to the diffraction of the second display light 50 in the hologram 11, and improve the visibility of at least the first display image 41.

The first projection part 12 according to the present embodiment includes the laser unit 7 that outputs the laser light and generates the first display light 30 by the laser light output from the laser unit. The predetermined wavelength region λ0 is the wavelength region of the laser light output from the laser unit 7. Since the wavelength regions λ1, λ2, and λ3 of the laser light are narrow, the predetermined wavelength region λ0 can be minimized.

The first projection part 12 according to the present embodiment includes the laser unit 7 that outputs the red laser light, the green laser light, and the blue laser light. The predetermined wavelength region λ0 includes the wavelength region λ3 of the red laser light, the wavelength region λ2 of the green laser light, and the wavelength region λ1 of the blue laser light. The first projection part 12 can display the first display image 41 with an arbitrary color by the three colors of laser light. In addition, since the wavelength regions λ1, λ2, and λ3 of the laser light are narrow, the predetermined wavelength region λ0 can be minimized.

In the present embodiment, the first region Tr1 is larger than the second region Tr2. In addition, the hologram 11 has the characteristic of condensing the diffraction light 40 toward the eye range ER of the vehicle 100. Thus, the display device 1 for a vehicle according to the present embodiment can display the first display image 41 in the wider range from the viewpoint of the user.

The first region Tr1 according to the present embodiment includes the lower first region Tr11 that overlaps with the second region Tr2, and the upper first region Tr12 that does not overlap with the second region Tr2. By this arrangement, the first display image 41 can be displayed overlapping with the foreground of the vehicle 100.

The second region Tr2 according to the present embodiment includes the upper second region Tr21 that overlaps with the first region Tr1, and the lower second region Tr22 that does not overlap with the first region Tr1. The upper second region Tr21 is larger than the lower second region Tr22. Since the upper second region Tr21 is larger, the first display image 41 and the second display image 61 can be displayed close to each other, and the visibility of the first display image 41 and the second display image 61 is improved. In addition, it becomes easier for the user to understand the cooperating display and interlocking display by the first display image 41 and the second display image 61.

Modification of Embodiment

How the first region Tr1 and the second region Tr2 overlap with each other is not limited to the state that is described in the above embodiment. For example, the first region Tr1 and the second region Tr2 may overlap with each other partially in the vehicle width direction. For example, an end of the first region Tr1 in the vehicle width direction and an end of the second region Tr2 in the vehicle width direction may overlap with each other.

The colors of the laser light output from the laser unit 7 are not limited to three colors of red, green, and blue. For example, the colors of the laser light output from the laser unit 7 may be two colors of red, green, and blue. The laser unit 7 may output the laser light with a single color.

In the first projection part 12, the device that generates the first display light 30 is not limited to the laser unit 7. For example, the first projection part 12 may generate the first display light 30 by the liquid crystal display unit. In this case, the first projection part 12 preferably includes a filter part (hereinafter referred to as "first filter part") whose characteristic is opposite to the characteristic of the filter part 22 of the second projection part 21. The first filter part transmits the light in the predetermined wavelength region $\lambda 0$ and cuts the light in the other wavelength region.

The second projection part 21 may generate the second display light 50 by the laser light. In this case, the wavelength region of the laser light output from the second projection part 21 is the wavelength region that is different from the predetermined wavelength region $\lambda 0$.

The display device 1 for a vehicle may include three or more display devices. For example, the display device 1 for a vehicle may include a third display device that projects third display light in addition to the first display device 10 and the second display device 20 according to the aforementioned embodiment. The third display device displays a third display image by the reflection light resulting from the reflection of the third display light on the windshield 101, for example. In the windshield 101, a third region where the third display light is incident overlaps with the first region Tr1. In this case, the third display device cuts the light in the predetermined wavelength region $\lambda 0$ from the third display light by a filter part that is similar to the filter part 22 of the second display device 20.

The contents disclosed in the embodiment and the modification can be implemented in combination as appropriate.

In the display device for a vehicle according to the present embodiment, the first region where the first display light is incident and the second region where the second display light is incident overlap with each other in the windshield. The second projection part includes the filter part that cuts the light in the predetermined wavelength region from the second display light, and the predetermined wavelength region is the wavelength region of the light diffracted by the hologram. By the display device for a vehicle according to the present embodiment, the occurrence of the ghost due to the light diffracted in the hologram can be suppressed and the deterioration in visibility of the display images can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, comprising:
    a first display device including a reflection type hologram that is disposed on a windshield of the vehicle, and a first projection part that projects first display light toward the hologram, and displaying a first display image by diffraction light diffracted by the hologram and reflected toward an eye range; and
    a second display device including a second projection part that projects second display light toward the windshield, and displaying a second display image by reflection light reflected by the windshield toward the eye range, wherein
    in the windshield, a first region where the first display light is incident and a second region where the second display light is incident overlap with each other,
    the second projection part includes a filter part that cuts light in a predetermined wavelength region from the second display light,
    the predetermined wavelength region is a wavelength region of the light diffracted by the hologram, and
    the second display light that passes through the filter is incident on the hologram and the hologram transmits, in a direction away from the eye range, the portion of the second display light that is incident on the hologram.

2. The display device for a vehicle according to claim 1, wherein
    the first projection part includes a light source that outputs laser light and generates the first display light by the laser light output from the light source, and
    the predetermined wavelength region is a wavelength region of the laser light output from the light source.

3. The display device for a vehicle according to claim 2, wherein
    the first projection part includes the light source that outputs red laser light, green laser light, and blue laser light, and
    the predetermined wavelength region includes a wavelength region of the red laser light, a wavelength region of the green laser light, and a wavelength region of the blue laser light.

4. The display device for a vehicle according to claim 1, wherein
    the first region is larger than the second region, and
    the hologram has a characteristic of condensing the diffraction light toward an eye range of the vehicle.

5. The display device for a vehicle according to claim 2, wherein
    the first region is larger than the second region, and
    the hologram has a characteristic of condensing the diffraction light toward an eye range of the vehicle.

6. The display device for a vehicle according to claim 3, wherein
    the first region is larger than the second region, and
    the hologram has a characteristic of condensing the diffraction light toward an eye range of the vehicle.

7. The display device for a vehicle according to claim 1, wherein
the first region includes a lower first region that overlaps with the second region, and an upper first region that does not overlap with the second region.

8. The display device for a vehicle according to claim 2, wherein
the first region includes a lower first region that overlaps with the second region, and an upper first region that does not overlap with the second region.

9. The display device for a vehicle according to claim 3, wherein
the first region includes a lower first region that overlaps with the second region, and an upper first region that does not overlap with the second region.

10. The display device for a vehicle according to claim 4, wherein
the first region includes a lower first region that overlaps with the second region, and an upper first region that does not overlap with the second region.

11. The display device for a vehicle according to claim 1, wherein
the second region includes an upper second region that overlaps with the first region, and a lower second region that does not overlap with the first region, and
the upper second region is larger than the lower second region.

12. The display device for a vehicle according to claim 2, wherein
the second region includes an upper second region that overlaps with the first region, and a lower second region that does not overlap with the first region, and
the upper second region is larger than the lower second region.

13. The display device for a vehicle according to claim 3, wherein
the second region includes an upper second region that overlaps with the first region, and a lower second region that does not overlap with the first region, and
the upper second region is larger than the lower second region.

14. The display device for a vehicle according to claim 4, wherein
the second region includes an upper second region that overlaps with the first region, and a lower second region that does not overlap with the first region, and
the upper second region is larger than the lower second region.

15. The display device for a vehicle according to claim 7, wherein
the second region includes an upper second region that overlaps with the first region, and a lower second region that does not overlap with the first region, and
the upper second region is larger than the lower second region.

\* \* \* \* \*